United States Patent [19]

Manos

[11] 4,306,585

[45] Dec. 22, 1981

[54] CONSTANT FLOW VALVE

[76] Inventor: William S. Manos, 344 Princeton Dr., Costa Mesa, Calif. 92626

[21] Appl. No.: 81,562

[22] Filed: Oct. 3, 1979

[51] Int. Cl.$^3$ ............................................. F16K 31/36
[52] U.S. Cl. ...................................... 137/504; 137/517
[58] Field of Search .................... 137/504, 517; 138/46

[56] References Cited

U.S. PATENT DOCUMENTS

| | | | |
|---|---|---|---|
| 2,022,143 | 11/1935 | Mottershall | 137/517 |
| 2,663,313 | 12/1953 | Doyle | 137/517 X |
| 3,106,226 | 10/1963 | Machen | 137/517 X |
| 3,204,664 | 9/1965 | Gorcher et al. | 138/46 |
| 3,331,389 | 7/1967 | Kirk | 137/517 X |
| 3,565,105 | 2/1971 | Murakami | 137/504 |
| 3,763,884 | 10/1973 | Grassi | 137/504 |
| 4,009,826 | 3/1977 | Walker | 137/517 X |

*Primary Examiner*—William R. Cline
*Attorney, Agent, or Firm*—G. Donald Weber, Jr.

[57] ABSTRACT

There is shown and described a valve which maintains a constant flow of fluid through a fluid passage even though input pressure varies in the fluid passage. The valve includes a body which has a progressively decreasing cross-sectional area therein between the respective inlet and outlet portions. A moveable damper in the valve automatically moves to alter the area between the damper and the valve body thereby to control the free area of fluid flow through the body. Thus, constant flow through the valve body is maintained despite pressure variations at the inlet portion. The valve configuration permits easy adjustment of fluid flow therethrough.

5 Claims, 5 Drawing Figures

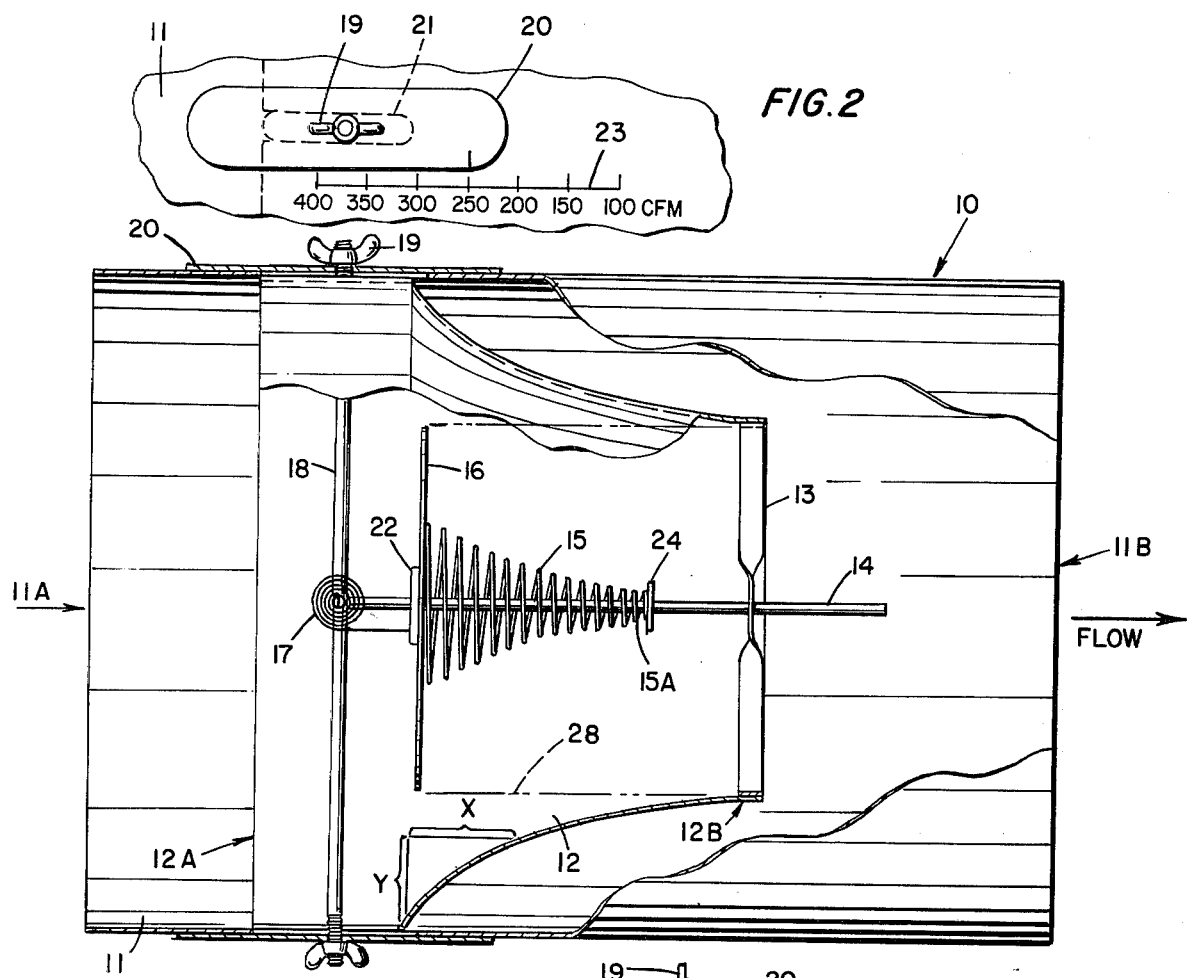
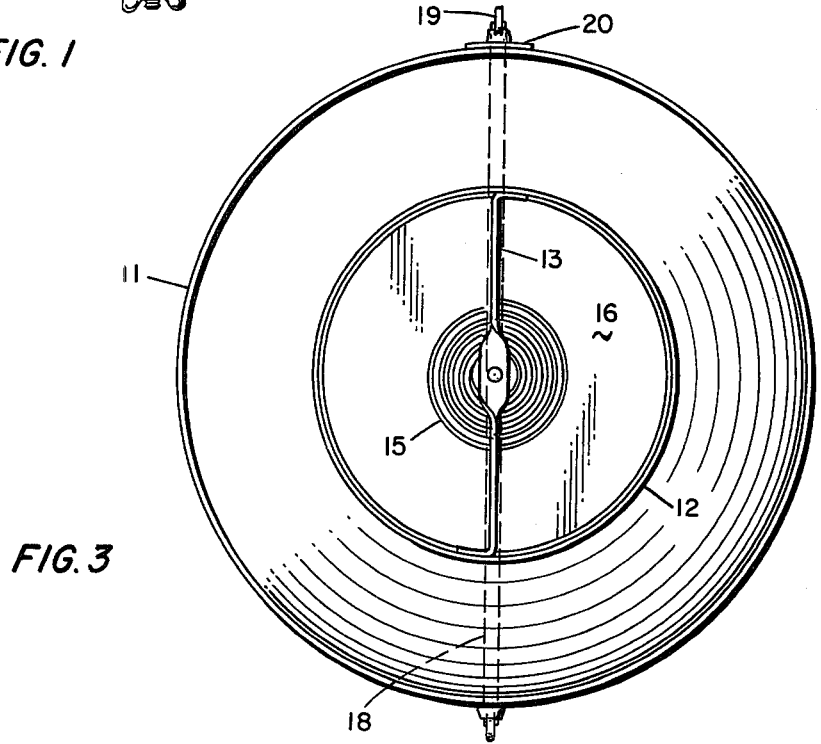

CONSTANT FLOW VALVE

BACKGROUND

1. Field of Invention

This invention relates to conduits for fluids, in general, and, more particularly, to a conduit which has a variably positioned restricting member therein for automatically providing a constant flow (volume) of fluid through the valve despite variations in inlet pressure.

2. Prior Art

In the field of fluid flow, and particularly in the field of heating and ventilating, including air-conditioning, it is desirable to provide a constant volume of fluid flow through various ducts and the like regardless of upstream (inlet) pressure variation in the supply fluid. The constant volume of fluid flow is highly desirable in order to produce even heating and/or cooling in large heating and ventilation systems.

To provide a constant volume of fluid flow, a valve which senses the upstream pressure variations and which, in response to such variations, automatically changes the cross-sectional area of the valve to compensate for the aforesaid upstream pressure variations is required. However, it is highly desirable to provide such a valve as inexpensively as possible in order to permit the system to be acceptable on a cost basis. There are known devices which function as flow control valves. However, many of the known devices have various shortcomings or problems. For example, in the known prior art type devices of similar import, constant flow is not accurately provided for various reasons. For example, in some of the existing devices back pressures, oscillations, eddy currents or the like are produced. Other devices produce a chattering or other undesirable noise effect. In addition, some of the known devices are extraordinarily expensive or require separate controls (e.g., springs) in order to vary the constant volume setting of the device. That is, most of the known devices of the type described herein have only moderate types or ranges of control and/or operation. Consequently, the devices are relatively ineffective over a broad range of flows or large pressure variations such that extensive manual adjustment and spring replacement is required in order to change flow rate. Also, these known valves tend to be inaccurate at low pressures. On the other hand, extensive manual adjustment and spring replacement in the known devices is required. Each of these approaches is terribly expensive and not very attractive to most users of this type of equipment.

Consequently, it is highly desirable to produce a valve which is capable of providing constant fluid flow over a wide range of pressure variations which can be adjusted in flow by simple manual or automatic means and to do so in a relatively inexpensive fashion.

PRIOR ART

The most pertinent prior art which is known to applicant as the result of a preliminary search is listed herewith.

U.S. Pat. No. 163,255, REHN. This patent is directed to a rudimentary gas regulating device including a spring loaded disc and a slotted head.

U.S. Pat. No. 770,913, LORD. This patent is directed to a gas regulating device including a coil-spring and a tapered, needle-nose valve stem.

U.S. Pat. No. 1,079,985, KAMINSKY. This patent is directed to a drinking fountain regulator comprising a tapered spring and a cylindrical body.

U.S. Pat. No. 3,204,659, RICHARDS, et al. This patent is directed to a device having a constant spring which spring is not mounted axially in the device.

U.S. Pat. No. 3,204,664, GORCHEV, et al. This patent is directed to a fluid regulating valve having a cylindrical spring and a tapered head portion.

U.S. Pat. No. 3,255,964, GORCHEV, et al. This patent is directed to a fluid regulating valve having a cylindrical spring and a tapered head portion.

U.S. Pat. No. 3,255,963, GORCHEV, et al. This patent is directed to a valve similar to the one noted above with thermostatic control.

U.S. Pat. No. 3,403,852, GORCHEV. This patent is directed to a dual duct fluid supply system using a valve similar to the type noted above.

U.S. Pat. No. 3,565,105, MURAKAMI. This patent is directed to a constant air volume device using a conical spring but a stepped, cylindrical body.

U.S. Pat. No. 3,763,884, GRASSI, et al. This patent is directed to a constant volume flow device using a disc, a tapered body, and a cylindrical linear spring.

U.S. Pat. No. 4,147,298, LEEMHUIS. This patent is directed to a fluid flow controller with a spring biased vane disposed across the diameter of the conduit.

SUMMARY OF THE INVENTION

The constant flow valve of this invention comprises a valve body defining an outer boundary of a fluid passage. A rod is mounted within the valve body in such a manner that it can be, selectively, moved axially within the valve body. A plate is slideably mounted on the rod to move therealong. A non-linear, compression spring is secured to the rod and in contact with the plate. The spring is selectively compressed by the force of the fluid against the plate. Constant flow is maintained by movement of the plate along the rod within the valve body against the force of the non-linear compression spring. System flow adjustment is accomplished by moving the entire rod-plate-spring assembly axially in the valve body so that the disc or plate movement due to the pressure changes, occurs in different regions of the valve body.

BRIEF DESCRIPTION OF THE DRAWINGS

FIG. 1 is a broken away view of the valve of the instant invention.

FIG. 2 is a view of an adjustment scale used with the valve shown in FIG. 1.

FIG. 3 is an end view of the valve shown in FIG. 1.

DESCRIPTION OF THE PREFERRED EMBODIMENT

Figure 4:
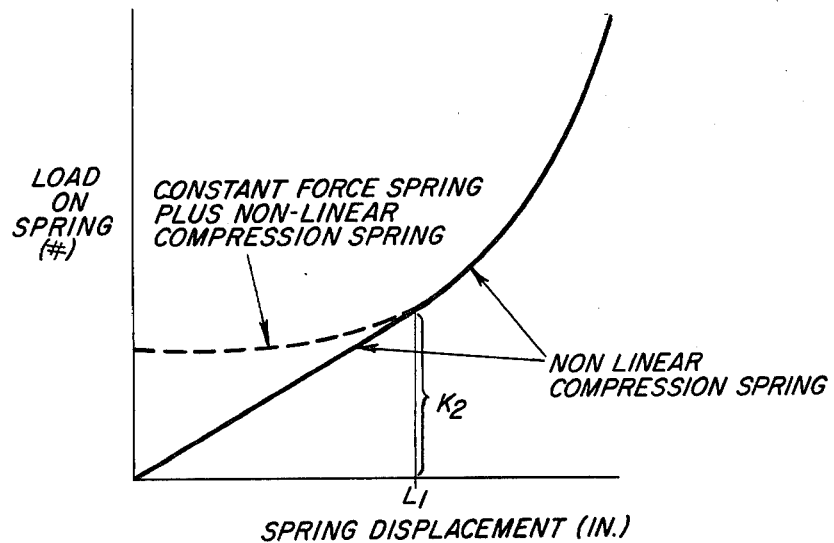
FIG. 4 is a graphic representation load vs displacement for the spring of the instant invention.

Referring now to FIG. 1 there is shown a partially broken away side view of the valve of the instant invention. In particular, an outer body 11 which joins with the conduit of the fluid handling system is shown. In the embodiment shown and described herein, valve body 11 is indicated to be cylindrical in configuration. However, it must be understood that other configurations are equally available. The input end 11A of valve body 11 is connected to receive fluid from the remainder of the system. Likewise, outlet end 11B is adapted to be connected to the remainder of the system in order that fluid flow can be continued therethrough. Fluid flow in the system is indicated by the arrow labeled FLOW. Thus, the body 11 (and, therefore, valve 10) can be inserted into the fluid passage conduit as an integral portion thereof.

The control portion of the valve includes an inner body 12 which includes inlet end 12A and outlet end 12B. Outlet end 12B is smaller in dimension than inlet end 12A. Again, in the embodiment shown and described, valve control body 12 has a substantially cylindrical configuration but other configurations are contemplated. The inlet end 12A of valve control body 12 is adapted to have substantially the same diameter as the inlet end 11A of the outer valve body 11. Typically, the inner and outer bodies 11 and 12 are fabricated of sheet metal of relatively thin dimensions. Therefore, the respective diameters can be substantially similar in dimension. Moreover, a suitable welding or other fastening arrangement can be provided to cause bodies 11 and 12 to be as nearly coextensive as possible.

Rod 18 extends transversely (diametrically) across the valve at the substantially contiguous end portions of bodies 11 and 12. Rod 18 may have threaded ends which extend through slots (see FIG. 2) in bodies 11 and 12. Appropriate wing nuts 19 or the like are threadedly engaged to the threaded ends of rod 18. Suitable washers, shoulders or other arrangements can be made to prevent rod 18 from passing through the slots in the bodies 11 and 12.

Rod 14 is joined to the mid-point of rod 18 and extends axially along the concentric bodies 11 and 12. The length of rod 14 is determined largely by the configuration of body 12, as described hereinafter. At the downstream or output end 12A of body 12, there is provided a suitable rod or twisted support ribbon 13 which is joined to the end of body 12 but includes, at the center thereof, an aperture through which rod 14 passes. The aperture in support rod 13 is of the appropriate size to permit rod 14 to pass therethrough in a relatively unhindered fashion, but to prevent excessive undesirable movement of the rod.

Disc 16 which has a diameter substantially similar to the diameter at the output end 12B of body 12 is provided on rod 14. Disc 16, which has a generally cylindrical or disc configuration, includes an aperture therein through which rod 14 passes. Again, the aperture in disc 16 is such that disc 16 can move, readily, on rod 14, but without any excessive chattering, vibration or the like. While not absolutely necessary, a suitable washer or annulus 22 is provided on the surface of disc 16 to better define the aperture through which rod 14 passes.

A non-linear, compression spring 15 is provided. Rod 14 passes through the center of spring 15 and is firmly attached thereto at the smaller end 15A of spring 15 which is disposed adjacent the output end 12B of body 12. Spring end 15A is fastened to rod 14 in any suitable manner. For example, a clamp 24 or the like can be used to clamp spring end 15A to rod 14. The larger end of spring 15 is fastened to disc 16 in a suitable manner. It will be noted that spring 15 is a non-linear, compression spring. That is, spring 15 has a substantially conical configuration with at least a portion of the smaller end thereof arranged to have a cylindrical spring configuration. While the spring 15 in FIG. 1 has a fairly smooth conical configuration, it should be noted that the actual shape or configuration of the spring can vary. That is, the spring may have a flared outer configuration. Conversely, the pitch or rate of the spring coils can be varied along the length thereof. Consequently, a nonlinear arrangement of the spring can be effected in a suitable or desirable method or manner.

In addition, a constant force spring 17 is attached to rod 18 and to disc 16. This constant force spring need not be used in each embodiment. However, the constant force spring 17 permits control by the valve through virtually the entire range of pressure variations which is possible (see FIG. 4). Moreover, this constant force spring 17 permits extremely accurate flow controls even at extraordinarily low fluid flow rates in the system whereby high efficiency is obtained as a result of low fan power requirements or the like.

Referring now to FIG. 2, there is shown a broken away portion of the valve body 11. Slot 21, shown dashed, is provided in valve body 11 through which the end of rod 18 can project. The wing nut 19 secures the end of rod 18, as described supra. In addition, a protective plate 20 is provided to secure and cover the opening produced by slot 21 in order to prevent leakage from the system. An appropriate scale 23 is inscribed on plate 11 and is indicative of and calibrated to show the flow in cubic feet per minute (or the like). Thus, by adjusting plate 20 so that the marker thereon interacts with scale 23, rod 18 is selectively moved. As rod 18 is moved (i.e., relocated) rod 14 is also relocated. When rod 14 is moved or relocated, spring end 15A (and, thus, spring 15) moves therewith and is also properly located and positioned (i.e., zeroed). Thus, relatively accurate control of the flow rate in the system is permissible inasmuch as the zero point for the valve is selectively adjusted.

Referring now to FIG. 3, there is shown an end view of the valve shown in FIG. 1. The outer body 11 is shown as is the end 12B of the control body 12. Likewise, disc 16 is shown to indicate the relative concentricity of the various members. Support member 13 is shown to support and guide rod 14. The conical shape of spring 15 is also shown and suggested as is control rod 18.

With the improved structure shown and described, it is possible to derive a new and unique formula for the curvature of the valve body in order to achieve the desired flow adjustment by actual movement of the compressing rod 14, disc 16 and spring 15 assembly. The formula for the free area as a function of the disc position in the valve body is as follows:

$$A_x = Q/27.78 \, C_x \sqrt{\frac{K2 e^{K1X}}{(0.03601) A_d F_x}} \quad (1)$$

where: $A_x$ is the free area as a function of X; X is the position of the disc in the valve body; Q is the desired flow in cubic feet per minute; $F_x$ and $C_x$ are variables determined by the valve body shape; and $A_d$ is the area of the disc in square inches.

This formula is based upon use of a non-linear compression spring which has the following characteristics or parameters: L is the length of the spring (in inches); L1 is the portion of the spring load-displacement function which is not exponential (in inches); and K1 and K2 define the load-displacement function in the exponential region of the spring.

The generalized formula for load as a function of displacement (without the constant force spring) is as follows:

(2) Load = $K2e^{K1X}$ (beginning at displacement L1).

As a result of the various tests and studies, it is determined that different zero settings and Q's may be selected and slightly different valve body curves will result. This is due to the fact that $F_x$ and $C_x$ may also vary. The final valve body configuration may be selected as a composite of curves calculated at different "zero points." However, the exponential spring minimizes the differences in the curve calculations, each of which represents the "ideal" valve curve for a specific "zero point." It should be noted that $F_x$ and $C_x$ are empirically derived values which are functions of the plate position in the valve body. $F_x$ provides the force against the plate for a given pressure drop. For example, at position X the force against the plate is: $F = F_x(0.03601) A_d \Delta P$. Likewise, $C_x$ is an empirically derived function which provides the amount of air that will pass through the valve at a given plate position and pressure drop. At position X, the value of $C_x$ is given by:

$$C_x = Q/(27.78) A_x \sqrt{\Delta P} \quad (3)$$

In one text fixture an exponential spring and valve body were used to test these concepts making use of the following dimensions and loads:

TABLE 1

| X | Y |
|---|---|
| 0.0 | 0.0 |
| 0.2 | 0.07 |
| 0.4 | 0.14 |
| 0.6 | 0.40 |
| 0.8 | 0.51 |
| 1.1 | 0.68 |
| 1.5 | 0.88 |
| 2.1 | 1.14 |
| 2.5 | 1.28 |
| 3.1 | 1.47 |
| 3.5 | 1.58 |
| 4.1 | 1.72 |
| 4.5 | 1.8 |
| 5.1 | 1.89 |
| 5.5 | 1.95 |
| 5.9 | 2.0 |

TABLE 2

| Load | Displacement |
|---|---|
| 0 | 4.556 |
| 0.25 | 3.760 |
| 0.50 | 3.169 |
| 0.75 | 2.671 |
| 1.00 | 2.268 |
| 1.25 | 1.968 |
| 1.50 | 1.703 |
| 1.75 | 1.504 |
| 2.0 | 1.296 |
| 2.25 | 1.151 |
| 2.50 | 1.029 |
| 2.75 | .926 |
| 3.00 | .830 |
| 3.25 | .733 |
| 3.50 | .633 |
| 4.00 | .554 |
| 4.25 | .486 |
| 4.50 | .418 |
| 4.75 | .326 | where in Table 1 X is the linear distance into the valve body from the beginning of the valve curvature (in inches), and Y is the maximum body (duct) radius minus the valve body radius at a point X (in inches). The load and displacement are given in pounds and inches, respectively, in Table 2.

Referring now to FIG. 4, there is shown a graphic representation of the relationship between the load on the springs vs the spring displacement. Typically, the load is measured in pounds while the displacement is measured in inches. The graph includes a solid line curve which is derived from generalized formula (2) as given supra. This formula, and thus the solid line curve, represents the valve operation based upon only the non-linear compression spring 15.

With the addition of constant force spring 17, the curve is varied to include the dashed line curve at the lower pressures. This composite curve (i.e. dashed line as continued by solid line) shows that better control is obtainable with the composite spring arrangement.

Figure 5:
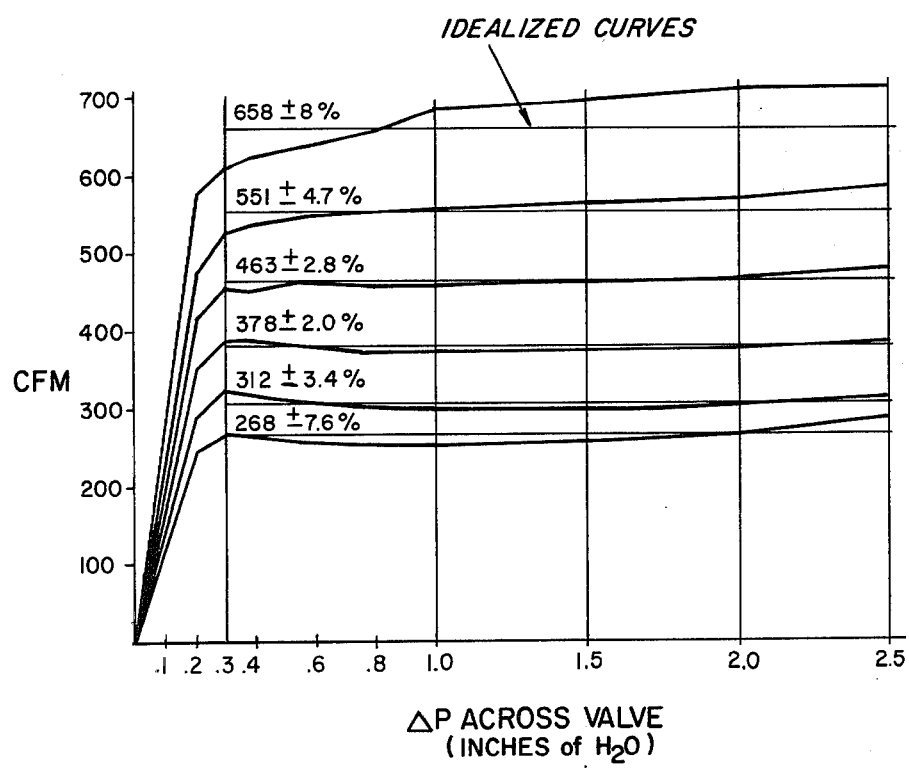
FIG. 5 is a graphic representation of the volume through the valve vs the pressure across the valve.

Referring now to FIG. 5, there is shown a graphic representation of the relationship of volume vs pressure. More particularly, the volume in cubic feet per minute (CFM) through the valve vs. the pressure drop (P) across the valve (inches of $H_2O$), is plotted. The several curves (heavy lines) are based upon different zero points or settings of the valve, as described above. The light lines represent the idealized version of these curves in terms of CFM. The percentage figures represent the variation of the test results versus the idealized figures in terms of flow from 0.5 to 2.5 inches $H_2O$. These curves represent the results of tests on a test fixture discussed above and tend to support the reliability of the formulae noted above.

Thus, there is shown and described an improved valve for a fluid flow apparatus. As indicated, the apparatus permits an adjustment of zero setting and the use of a non-linear compression spring to permit a relatively minor adjustment and a unique device configuration to provide a constant fluid flow control over a wide range of pressure conditions. The description has shown certain specifications and arrangements which are possible. Other modifications may be suggested to those skilled in the art. However, any such modifications which fall within the purview of this description are intended to be included herein as well. The description is intended to be illustrative only and is not intended to be limitative. Rather, the scope of the invention is limited only to the claims appended hereto.

Having thus described a preferred embodiment of the instant invention, what is claimed is:

1. A valve for producing a constant fluid flow therethrough comprising:
    a valve body having an inlet portion, an outlet portion of smaller cross-section than said inlet portion, and a body portion of progressively and smoothly decreasing cross-section disposed between said inlet and said outlet portions,
    shaft means mounted axially in said valve body,
    flow restriction means movably mounted on said shaft means in said decreasing body portion for controlling flow therethrough,
    nonlinear compression spring means for normally biasing said flow restriction means toward said inlet portion of said valve body,
    one end of said nonlinear compression spring means connected to said shaft means,
    the other end of said nonliner compression spring means connected to said flow restriction means, said nonlinear compression spring means having a spring rate characteristic which is mathematically related to the configuration of said progressively decreasing body portion to produce constant flow through said valve despite variations in the pressure applied to said flow restriction means at the inlet portion of said valve body, said mathematical relationship between said spring rate characteristic and the configuration of the progressively decreasing body portion is $$A_x = Q/27.78\ C_x \sqrt{\frac{K2e^{K1X}}{(0.03601)\ AdF_x}}$$

where $K2e^{K1X}$ is the load-displacement function for the exponential portion of said non-linear spring; $A_x$ is the free area as a function of X; X is the position of the flow restriction means in the valve body; Q is the desired flow in cfm.; $F_x$ and $C_x$ are variables determined by the valve body shape; and Ad is the area of the flow restriction means in square inches.

2. The valve recited in claim 1 wherein,
said nonlinear compression spring means has a substantially conical configuration with the smaller end thereof connected to said rod means and the larger end thereof connected to said flow restriction means.

3. The valve recited in claim 1 including,
constant force spring means connected to normally bias said flow restriction means toward said inlet portion of said valve body.

4. The valve recited in claim 1 including,
adjustment means for selectively moving said nonlinear compression spring means and said flow restriction means relative to said valve body to establish a zero reference point.

5. The valve recited in claim 1, wherein,
said non-linear compression spring includes at least a portion thereof which has an exponential configuration.

* * * * *